(12) United States Patent
Menguy

(10) Patent No.: US 9,864,156 B1
(45) Date of Patent: Jan. 9, 2018

(54) MULTI-PURPOSE SEALING DEVICE

(71) Applicant: 3M INNOVATIVE PROPERTIES COMPANY, St. Paul, MN (US)

(72) Inventor: Michel T. Menguy, Le Relecq-Kerhuon (FR)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/609,944

(22) Filed: May 31, 2017

Related U.S. Application Data

(60) Provisional application No. 62/357,434, filed on Jul. 1, 2016.

(51) Int. Cl.
| | | |
|---|---|---|
| *G02B 6/245* | (2006.01) | |
| *G02B 6/38* | (2006.01) | |
| *G02B 6/44* | (2006.01) | |
| *H01R 13/52* | (2006.01) | |
| *G02B 6/02* | (2006.01) | |

(52) U.S. Cl.
CPC ......... *G02B 6/443* (2013.01); *G02B 6/02395* (2013.01); *G02B 6/245* (2013.01); *G02B 6/3825* (2013.01); *G02B 6/3849* (2013.01); *G02B 6/3893* (2013.01); *G02B 6/4403* (2013.01); *G02B 6/4465* (2013.01); *G02B 6/4494* (2013.01); *H01R 13/5213* (2013.01)

(58) Field of Classification Search
None
See application file for complete search history.

(56) References Cited

U.S. PATENT DOCUMENTS

| | | |
|---|---|---|
| 6,926,449 B1 | 8/2005 | Keenum |
| 7,090,406 B2 | 8/2006 | Melton |
| 7,549,802 B2 | 6/2009 | Bell |
| 7,614,797 B2 | 11/2009 | Lu |
| 7,686,519 B2 | 3/2010 | Lu |
| 7,744,288 B2 | 6/2010 | Lu |
| 8,556,520 B2 | 10/2013 | Elenbaas |
| 8,672,705 B2 | 3/2014 | Schneider |
| 9,140,858 B2 | 9/2015 | Xiong |
| 9,379,488 B2 | 6/2016 | Schneider |
| 9,543,746 B2 * | 1/2017 | Dower et al. ........ H02G 15/113 |

(Continued)

FOREIGN PATENT DOCUMENTS

| | | |
|---|---|---|
| CN | 201707478 | 1/2011 |
| CN | 202351459 | 7/2012 |

(Continued)

*Primary Examiner* — Jerry Rahll
(74) *Attorney, Agent, or Firm* — Janet Kling

(57) ABSTRACT

A multi-purpose sealing device is described herein for use in a port structure of fiber terminal, telecommunication enclosure; or a bulkhead. The exemplary sealing device has a body having an open end and a closed end, wherein the closed end includes a removable portion and a pulling device to facilitate removal of the exemplary sealing device from a port structure. In one aspect, the exemplary sealing device is a single part made of a resilient material, while an alternative aspect, the exemplary sealing device includes a rigid connection portion disposed within the open end of the body. The exemplary device can be used as a dust cap or plug prior to making a service connection and/or it can be used as a port/cable sealing device after the service connection is made.

19 Claims, 13 Drawing Sheets

(56) References Cited

U.S. PATENT DOCUMENTS

| | | | |
|---|---|---|---|
| 9,638,871 B2* | 5/2017 | Bund | G02B 6/387 |
| 2011/0305422 A1* | 12/2011 | Thompson | G02B 6/4446 |
| | | | 385/94 |
| 2014/0219621 A1* | 8/2014 | Barnette, Jr. | G02B 6/4439 |
| | | | 385/135 |
| 2014/0226935 A1* | 8/2014 | Allen | G02B 6/4444 |
| | | | 385/59 |
| 2014/0226945 A1* | 8/2014 | Claessens | H02G 15/013 |
| | | | 385/135 |
| 2014/0355936 A1 | 12/2014 | Bund | |
| 2015/0219857 A1 | 8/2015 | Lichoulas | |
| 2015/0253528 A1 | 9/2015 | Corbille | |
| 2015/0331213 A1* | 11/2015 | Wimmer | H02G 15/117 |
| | | | 343/905 |
| 2016/0041356 A1* | 2/2016 | Wang | G02B 6/3825 |
| | | | 385/56 |
| 2016/0047994 A1 | 2/2016 | Conner | |
| 2016/0062045 A1 | 3/2016 | Harwath | |
| 2016/0131857 A1 | 5/2016 | Pimentel | |
| 2016/0223759 A1* | 8/2016 | Marcouiller | G02B 6/4444 |
| 2016/0327754 A1* | 11/2016 | Hill | G02B 6/3879 |
| 2016/0349474 A1* | 12/2016 | Kowalczyk | G02B 6/4465 |
| 2016/0365685 A1* | 12/2016 | Lundbring | H01R 11/12 |

FOREIGN PATENT DOCUMENTS

| | | |
|---|---|---|
| CN | 203133321 | 8/2013 |
| CN | 103064152 | 8/2016 |
| EP | 2452404 B | 7/2016 |
| WO | WO 2014-039812 | 3/2014 |
| WO | WO 2015-028433 | 3/2015 |

* cited by examiner

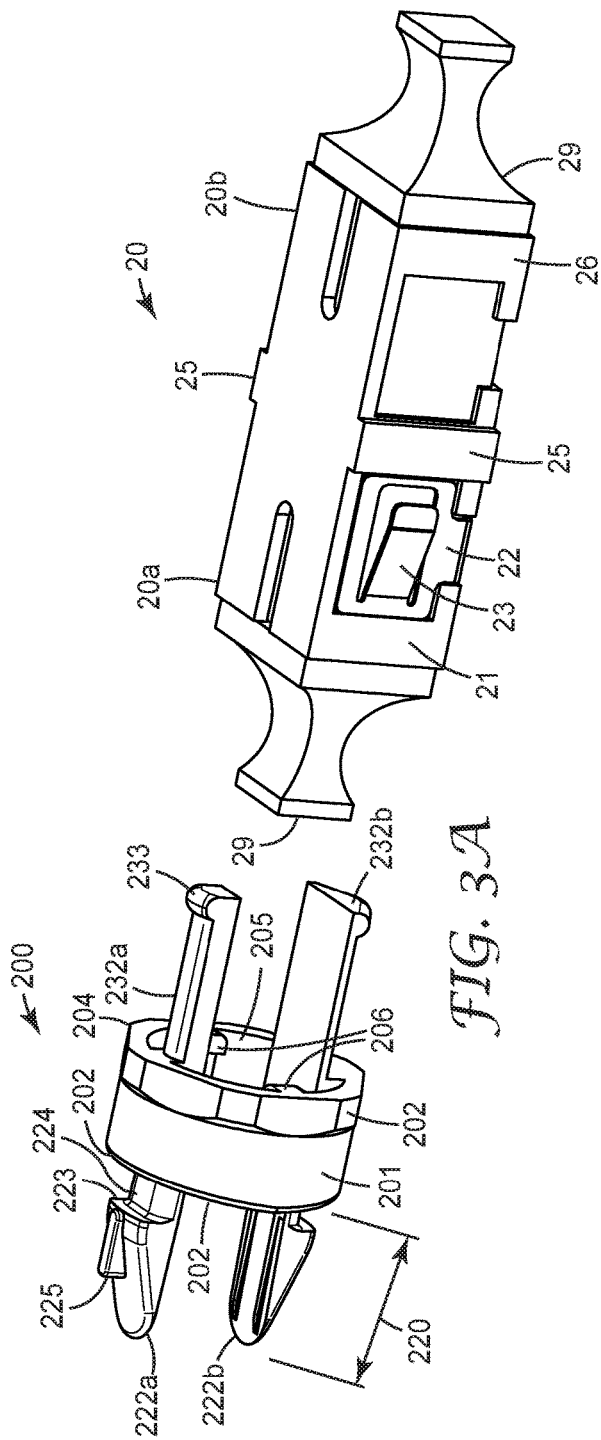
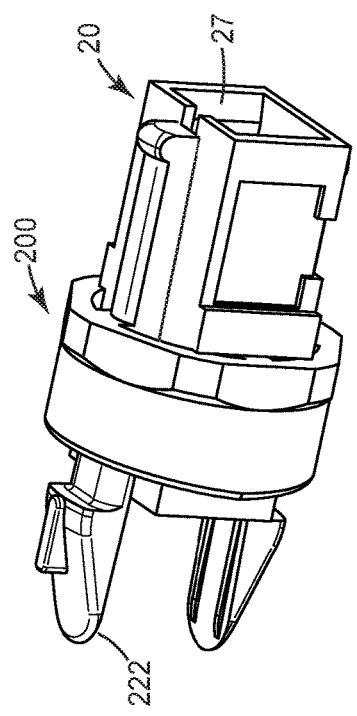
FIG. 3A
FIG. 3B

MULTI-PURPOSE SEALING DEVICE

FIELD OF THE INVENTION

The present invention relates to a sealing device used to environmentally seal the port of an optical fiber terminal, enclosure or bulkhead before and after a service connection is made. In particular, the exemplary sealing device includes a removable portion in a closed end of the sealing device to allow insertion of a non-ruggedized optical fiber connector to be inserted there through.

BACKGROUND OF THE INVENTION

Telecommunication cables are ubiquitous and used for distributing all manner of data across vast networks. The majority of cables are electrically conductive cables (typically copper), although the use of optical fiber cables is growing rapidly in telecommunication systems as larger and larger amounts of data are transmitted. Additionally, as data transmissions increase, the fiber optic network is being extended closer to the end user which can be a premise, business, or a private residence.

As telecommunication cables are routed across data networks, it is necessary to periodically open the cable so that one or more telecommunication lines therein may be spliced and connected to other cables or "branches" of the telecommunication network. At each point where a telecommunication cable is opened, it is necessary to provide a telecommunication enclosure to protect the exposed interior of the cable. The cable branches may be further distributed until the network reaches individual homes, businesses, offices, and so on. These networks are often referred to as fiber to the X (FTTX) networks which can include fiber to the premise (FTTP), fiber to the home (FTTH) and fiber to the antenna (FTTA) networks.

In an FTTH network, optical fiber is brought to the end user and connected to the optical network terminal (ONT) unit mounted on a wall or elsewhere in the premises of the end user. For example, in a home or living unit of an apartment or other multi-dwelling structure, the ONT may be located near the television, on a desk, or near the telephone. The ONT converts this optical signal into conventional electrical signals to provide voice (telephone), Internet (data), video signals and/or wireless signals (WIFI) to the end user.

Fiber terminals are one type of telecommunication enclosure that is typically located near an end user in a FTTP or FTTH network to distribute the final service to the end user. Typical fiber terminals are designed to drop services (to provide service connections) to a small number of premises having typically between four to sixteen end users. The last service connection from the fiber terminal is made to the ONT, located at the end user using a drop cable. The service providers want a plug and play solution to facilitate extension of their fiber to the home installations as they extend their networks closer to their customers.

Today, ruggedized optical connectors attached to the terminal ends of optical fiber drop cables are gaining popularity for quick, reliable field service connections to environmentally protect the optical connection by providing an environmental seal between the terminal and the and ruggedized connector housing as well as between the connector housing and the drop cable. Several conventional ruggedized connectors have a proprietary connection interface, are factory terminated onto the optical fiber drop cable, can be overdesigned for aerial final drop installations, and can be expensive.

In addition, service providers are asking for solutions that use drop cables that have standard format, non-hardened connectors, but these connectors do not provide an adequate environmental seal, so that if they are used they must be disposed in the interior of the optical fiber terminal, not providing the plug and play solution that the service providers are looking for as they extend their fiber networks closer to the end-user's premises.

SUMMARY OF THE INVENTION

In a first embodiment, a multi-purpose sealing device is described herein for use in a port structure of fiber terminal, telecommunication enclosure; or a bulkhead. The exemplary sealing device has a body having an open end and a closed end, and a connection portion configured to secure the sealing device in the port structure. The closed end of the body includes a removable portion and a pulling device to facilitate removal of the exemplary sealing device from a port structure. In one aspect, the exemplary sealing device is a single part made of a resilient material, while in an alternative aspect, the exemplary sealing device includes a rigid connection portion disposed within the open end of the body. The exemplary device can be used as a dust cap or plug prior to making a service connection or it can be used as a port/cable sealing device after the service connection is made.

In a second embodiment, a multi-purpose sealing system is disclosed which enables making plug play fiber optic drop cable service connections in a port structure in a fiber terminal, enclosure or bulkhead. The sealing system includes an optical fiber connector adapter, a port adapter to secure the optical fiber connector adapter at least partially within the port structure and a multi-purpose sealing device. The multi-purpose sealing device is configured to environmentally seal the port structure before and after the service connection is made. The multi-purpose sealing device comprises a body having an open end and a closed end, wherein the closed end includes a removable portion and a pulling device to facilitate removal of the exemplary sealing device from a port structure, and a connection portion configured to secure the sealing device in the port structure.

In a third embodiment, a method of making a service connection in a fiber terminal is disclosed. The fiber terminal has a port structure that includes a plurality of ports. An optical fiber connector adapter is disposed in each of the plurality of ports and a multi-purpose sealing device is removably disposed in at least one of the plurality of ports, wherein the sealing device has a body having an open end and a closed end, wherein the closed end includes a removable portion and a pulling loop. The method includes extracting the sealing device from at least one of the at least one ports by grabbing onto the pulling device and exerting an extraction force away from the fiber terminal, tearing the removable portion away from the closed end of the sealing device to create an insertion opening, inserting a non-ruggedized optical fiber connector through the insertion opening of the sealing device, plugging the non-ruggedized optical fiber connector into the optical fiber connector adapter disposed within one of the plurality of ports, and installing the sealing plug into one of the plurality of ports over the non-ruggedized optical fiber connector by inserting the open end of the sealing device into the port.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIGS. 3A-3B are two views of an exemplary port adapter usable with the multi-use sealing device of FIGS. 1A-1C;

Figure 1A:
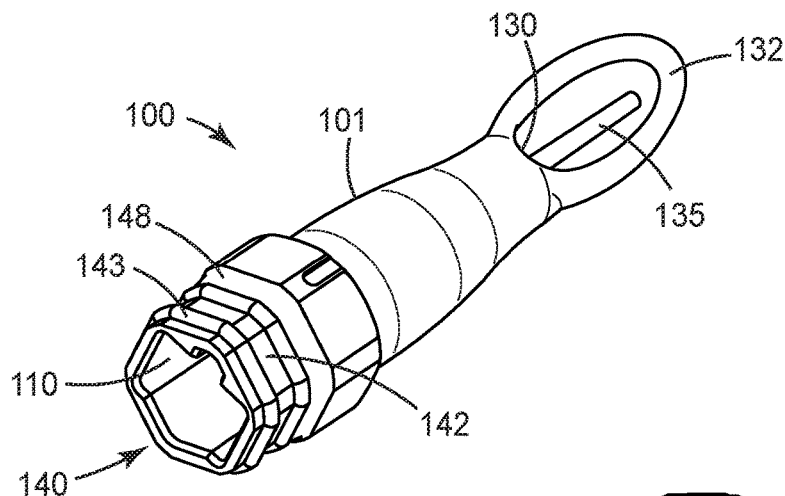
FIGS. 1A-1C show three views of a first embodiment of an exemplary multi-use sealing device according to an aspect of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE DRAWINGS

In the following detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Ruggedized optical fiber connectors fall into two broad categories. In the first group of ruggedized optical fiber connectors, the drop cable is rigidly fixed with respect to the connector housing and the control of the axial connection forces is transferred to a hardened receptacle which includes a resilient compensating member such as a spring loaded receptacle. These ruggedized fixed cable connectors generally have a specialized connection format which cannot be directly mated with a conventional optical fiber coupling such as an SC format coupling, an LC format coupling, etc. without the addition of a supplemental accessory disposed at the extremity of the ruggedized connector.

The second category of ruggedized connectors are configured to mate with conventional optical fiber connector in a standard format optical fiber coupling. In these ruggedized connectors, the backbones of the connectors are resiliently connected to the ruggedized connector housing allowing the drop cable to move axially with respect to the connector housing. These ruggedized connectors and corresponding connection receptacles can be oversized in terms of mechanical and sealing performance for high density above ground or aerial applications.

The present solution utilizes lower cost standard format optical fiber connectors and optical fiber connector adapters or couplings to enable an environmentally protected plug and play connection solutions for above ground or aerial applications to provide the final service connection to the end user's home or premises. This solution can be more flexible and cost efficient for the service providers allowing a faster roll-out of high speed optical fiber data connections to the end user.

Figure 1B:
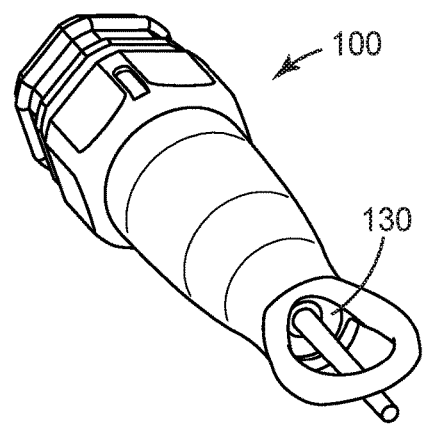
Figure 1C:
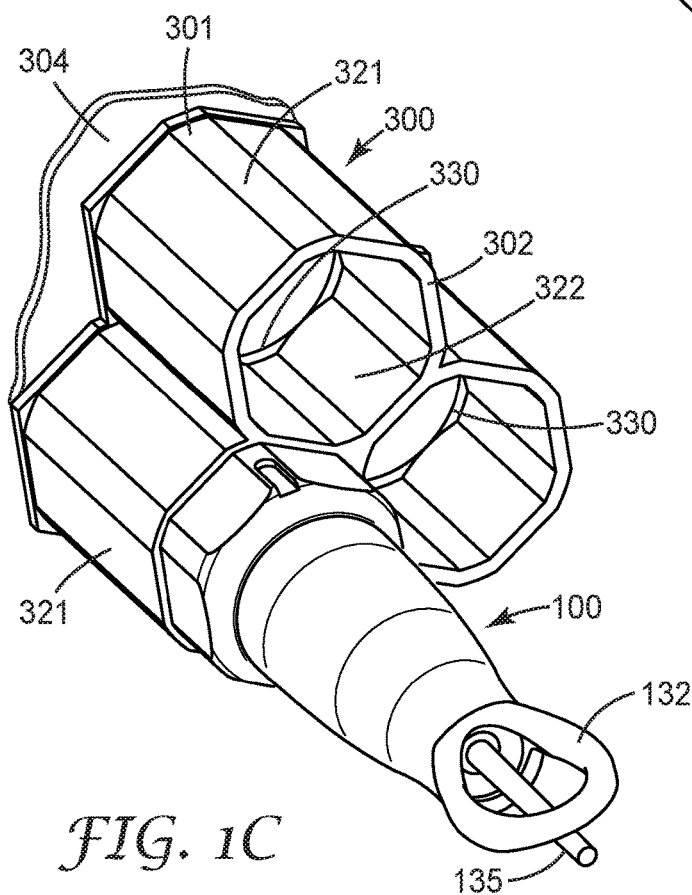

Referring to FIGS. 1A-1C, the exemplary multi-use sealing device 100 has a body 101 having an open end 110 and a closed end 130 and a connection portion 140 disposed at the open end of the body. The external dimensions of the connection portion is formed so that it engages with the port structure 300 (FIG. 1C) to prevent ingress of dust and moisture into the optical fiber terminal, enclosure or through a bulkhead prior to providing the final service connection to the customer. The connection portion can include sealing structures such as one or more circumferential ribs 143 or fins disposed on or extending from the exterior surface 142 of the connection portion such that the maximum circumference of the circumferential rib is slightly larger than the internal circumference of the port structure into which it will be inserted. In an exemplary aspect, sealing device 100 can further include an inclined sealing face 148 disposed between the body and the connection portion that is configured to seal against the second end 302 of the opening or port in a port structure of a fiber optic terminal, telecommunication enclosure or bulk head.

The closed end 130 of the body 101 includes a removable portion 135 and a pulling device or loop 132 to facilitate removal of the exemplary sealing device from a port structure in a fiber terminal, enclosure or bulkhead. When the removable portion is in place and the sealing device 100 is disposed in a port of a port structure 300 (FIG. 1C), in a fiber terminal, enclosure or bulkhead, the sealing device serves its first function as a dust cap and sealing member for a port structure of an optical fiber terminal, to prevent ingress of dirt or moisture before a service connection is made. When a customer requests service, the installer can grasp the pulling loop to extract the pulling device from the port structure to allow connection of a preterminated optical fiber drop cable, which is described in detail below. While the embodiments shown in the figures utilize a pulling loop, the pulling device of the exemplary multi-purpose plug may have other structures. For example, a pulling tab extending from the closed end of the sealing device should be considered to fall within the scope of the present invention.

FIG. 1C shows the exemplary sealing device disposed in one port of a schematic representation of port structure 300 that can be found in some optical fiber terminals and enclosures. Port structure 300 extends from a wall portion 304 of an optical fiber terminal, enclosure or bulkhead. In an exemplary aspect, the port structure includes an opening or port (not shown) through the wall portion. Port structure includes a tubular sleeve section 321 extending from one surface of the wall portion around the port opening. In the case of a telecommunication enclosure or terminal, the sleeve section can extend from an exterior surface of the wall portion, the interior surface of the wall portion inside the enclosed space of the terminal or enclosure body, or can extend from both the interior and the exterior surface of the wall portion to that a portion of the sleeve section is disposed inside the enclosure and a portion of the sleeve section extends outside of the enclosure. For a bulkhead, the sleeve portion can extend from either side of the wall portion or can extend from both sides of the wall portion. In an exemplary aspect, the sleeve section is integrally formed with the wall portion. Alternatively, the sleeve section can be formed separately and attached to the wall section by mechanical means such as mechanical fasteners or integrally formed latch arms, for example, or the sleeve section can be bonded to the wall portion by an adhesive or by a welding technique.

Port structures can be in the form of a singular structure that can be arranged in one and two dimensional spaced apart arrays (i.e. each sleeve section is distinct). While in another aspect, the sleeve sections can be conjoined, enabling a higher density of ports in the enclosure or bulkhead.

For example, FIG. 1C shows a portion of a telecommunication enclosure having a two dimensional, conjoined port structure. Sleeve section 321 has a first end 301 at the wall portion 304 of the port structure 300 and a second end 302 disposed at the end opposite the first end. The sleeve section is tubular having a channel 322 extending from the second end to the first end and through the wall portion 304. The point at which the channel passes through the wall portion is defined as the port opening or port 330. The sleeve section of the port structure can have an external shape of a hexagonal prism, although geometric configurations such as a cylinder, a rectangular prism or other polygonal prism.

In an exemplary aspect, the port opening or port 330 can be generally circular in shape or can have other shapes as required by the chosen application. In FIG. 4B, port opening 430 can have corners 421 that have been squared off to allow the port opening to accept at least a portion of a fiber optic connector adapter 20 ensuring alignment of the optical fiber connector adapter and the port of the fiber terminal enclosure or bulkhead. Additionally, the port opening includes one or more alignment notches 415. Alignment notch 415 can be used in conjunction with a keying protrusion 225 of a port adapter 200 which can aid in securing the optical fiber connector adapter within the port structure or can facilitate the securing of the sealing device 100 within the port structure. The alignment notch and keying protrusion ensure that the port adapter is inserted into the port structure in a known orientation. Port adapter 200 will be described in more detail below in reference to FIGS. 3A-3B.

In an exemplary aspect, the body 101 and the connection portion 140 of sealing device 100 can be formed of a single unitary part made of the same material, as shown in FIGS. 1A-1C. Alternatively, the exemplary sealing device can be formed from a plurality of parts as will be described below with reference to FIG. 6A-6E.

In an exemplary embodiment, the body 101 and connection portion 140 of sealing device 100 are formed from a compression molded resilient material. The resilient material is selected such that the connection portion 110 and/or the sealing face 148 of the sealing device 100 can be compressed when introduced into/against the port structure to provide an environmental seal with the port structure. The selection of the correct resilient material allows the closed or second end 130 to elongate sufficiently so that a conventional optical fiber connector mounted on the terminal end of a fiber optic drop cable can pass through the insertion opening 136 (FIG. 5D) after extraction of the removable portion 135. The insertion opening should have a diameter that is smaller than the diameter of the fiber optic drop cable that will pass through it. The resilient material should also have sufficient elasticity to form an environmental seal around the drop cable and manage the bend radius of the fiber drop cable after connection to the fiber terminal, as well as being resistant to ultraviolet radiation and chemical products. The exemplary resilient material can be selected from an acrylonitrile butadiene rubber, silicone rubber, or ethylene propylene diene monomer rubber.

In an exemplary aspect, the exemplary resilient material for the body of the sealing device will have a Shore A hardness between about 30 and about 50.

The fiber optic drop cable typically can include a semi-rigid outer sheath or jacket surrounding at least one optical fiber and can include one or more strength members. The optical fibers may be enclosed in one or more loose buffer tubes or may be provided as one or more optical fiber ribbon cables. One to twelve optical fibers may reside in the loose buffer tube surrounded by a water-blocking gel or grease. Each of the ribbon cables may have from one to about twenty-four optical fibers. Each optical fiber has a polymeric coating that surrounds and protects the glass fiber. Examples of exemplary optical fiber cables include ResiLink ADF™ All-Dielectric Flat Drop Cable available from Pirelli Cables and Systems (Columbia, N.C.) or EZ DROP cable from Draka (Claremont, N.C.), fiber reinforced plastic (FRP) optical cable available from Shenzhen SDG Information Company, Ltd. (Shenzhen, China), SE*-LW* FTTH All Purpose Optical Drop Cables and SE-8 PureAccess™ Single Mode Optical Fiber each of which is available from Sumitomo Electric (Research Triangle Park, N.C.), Mini DP Flat Drop Cable available from OFS (Norcross, Ga.). The strength members may be either semi-rigid rods or a collection of loose fibers or floss, e.g. made of aramid fibers or glass.

Figure 2A:
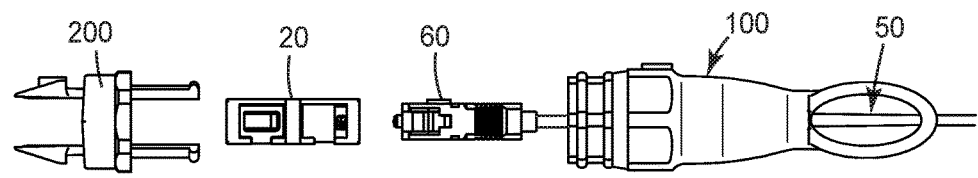
FIGS. 2A-2C illustrate the second function of the multi-use sealing device of FIGS. 1A-1C in conjunction with a fiber optic drop cable with three different standard format optical fiber connectors.
Figure 2B:
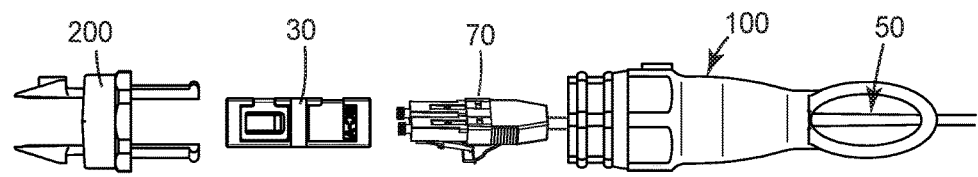
Figure 2C:
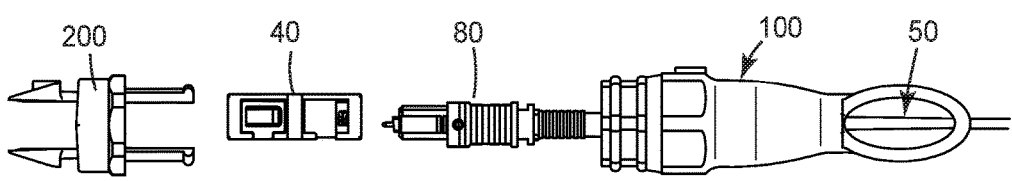

The optical fiber drop cable can be preterminated with a standard format optical fiber connector. For example, the standard format optical fiber connector can be an SC-format connector 60 (FIG. 2A), a duplex LC-format connector 70 (FIG. 2B) or an MPO-format connector 80 (FIG. 2C). Each standard format optical fiber can be connected to another similar optical fiber connector by a complementary format optical fiber connector adapter, for example, an SC-format optical fiber connector adapter 20 (FIG. 2A), an LC duplex format optical fiber connector adapter 30 (FIG. 2B), and an MPO format optical fiber connector adapter 40 (FIG. 2C). However, as would be apparent to one of ordinary skill in the art given the present description, the optical fiber connector on the terminal end of the optical fiber drop cable can have other standard formats, such as MT, ST, FC, and MU connector formats and can also be used with the exemplary connector structure described herein and are considered to be within the scope of the present disclosure.

The multi-use sealing device described herein can be used in applications where a non-ruggedized optical connection is made from outside of an environmentally protected space such as a sealed enclosure or terminal, a cabinet or a building in FTTx optical fiber networks. The exemplary sealing device is especially well-suited for above ground or aerial network applications. In many applications, exemplary sealing device is used at the interface between the protected space within a protective enclosure and the unprotected external environment and as such must ensure that the protected space is maintained when the non-ruggedized optical fiber connectors are used to make optical connections by providing an environmental seal between port structure and the sealing device as well as between the sealing device and the cable being terminated by said connector.

In one exemplary aspect, the exemplary sealing device 100 can be used to connect an end user to a remote fiber terminal in a fiber to the premise network. In another aspect of the invention, the exemplary sealing device can be used to connect an antenna on a cellular tower to equipment in a base station located at the foot of the tower. In another aspect, the sealing device when used in conjunction with the LC duplex format connectors 70 shown in FIG. 2B can be used in fiber to the antenna installations.

The exemplary sealing device can be fitted into a port structure of a fiber optic terminal when the terminal is installed prior to making the service connections to the customer as represented by FIG. 1C.

When a customer signs up for fiber to the home services, the installer can remove the exemplary sealing device from the port structure, remove the removable portion from the sealing device to create an insertion opening for inserting a standard format connector into the sealing device. The connector is passed through the insertion opening in the sealing device in so that the sealing device can now slide on the drop cable. Then, the connector is plugged into a connector adapter disposed in the port structure in the fiber terminal and the sealing device slid down over the standard optical fiber format connector so that the open end of the sealing device is fitted into the port structure to weatherproof the fiber connection.

In one aspect of the present invention, the exemplary sealing device can be used to protect an external non-ruggedized optical fiber that is inserted directly into the port structure of a protective enclosure or terminal into an optical fiber connector adapter disposed at least partially within the protected space of the protective enclosure. Alternatively, the optical fiber connector adapter can be disposed inside the port structure of the fiber terminal, such that the optical interconnection point between an external non-ruggedized optical fiber and an internally located second connector is disposed within the length of the port structure.

However, port structures of protective enclosures can vary in size and shape by the type/style of protective enclosure as well as from manufacturer to manufacturer. Thus, a port adapter 200 may be needed to hold the fiber optic connector adapter within the port structure of the fiber terminal. In addition, the port adapters can be used to adjust the size and shape of the port structure to that required to accommodate a ruggedized optical fiber connector.

An exemplary port adapter 200 is shown in FIGS. 3A-3B. Port adapter 200 has an adapter body 201 having a first end 202 and a second end 204 and a passageway 205 extending through the adapter body from the first end to the second end. Adapter body 201 includes a securing portion 220 extending from the first end of the adapter body. The securing portion can be configured to secure the port adapter into the port structure of a protective enclosure, terminal, and/or bulkhead which secures an optical coupling 20 into which a non-ruggedized optical fiber connector and another standard optical fiber connector can be inserted to make an optical connection.

The securing portion 220 includes a pair of port latches 222a, 222b (or collectively 222) configured to secure port adapter 200 into the port structure of a fiber terminal or at a bulkhead. Port latches 222 can be in the form of spring arms having a notch 224 between the adapter body 201 of port adapter 200 and a hook portion 223 that engages with a wall portion, such as wall portion 404 of the port structure 420 in FIG. 4B disposed in a base 409 of a fiber terminal in which it is installed. The port latches can be flexed in toward the centerline of the port adapter when the port adapter is inserted into the port structure. Once the first end of the port adapter has passed a sufficient distance through the port structure, the port latches will spring out so that a hooked portion 223 on an outer surface of the latch arm engages with the wall portion of the port structure to secure the port adapter therein. In an exemplary aspect, the port adapter can have a keying protrusion 225 formed on at least one of the exterior port latches to serve as a key when the port adapter is inserted into the port structure in a known orientation.

In some embodiments, the installation of the optical coupling 20 into port adapter 200 serves as a secondary locking mechanism for the port latches 222 (shown in FIG. 3B). When the coupling is disposed in the securing section, the port latches cannot flex in toward the centerline of the port adapter preventing the removal of the port adapter from the port structure.

The body 201 of port adapter 200 has a generally tubular structure such that the external shape of the body is configured to closely fit with the internal geometry of the port structure into which it will be inserted. In the exemplary aspect, the body portion has a generally hexagonal cross-section that is configured to fit into a hexagonal port structure such as is found in BPEO closures which are available from 3M Company (St. Paul, Minn.). In other aspects, the external shape of the cuff portion can be rectangular, cylindrical or another shape which is commonly used in protective telecommunication enclosures.

Port adapter 200 is configured to accept and secure an optical fiber connector adapter, such as an SC format optical fiber connector adapter 20, at least partially therein. Optical fiber connector adapter 20 has a first side 20a and a second side 20b disposed on either side of a flange 25 and includes first connector receiving portion 21 disposed on a first side of the flange, a second connector receiving portion 26 on a second side of the flange and a ferrule alignment sleeve (not shown) disposed within the optical fiber connector adapter along the central axis of the optical fiber connector adapter and extending through the flange into each of the first and second connector housings. Each of the connector receiving portion includes a connector port (for example connector port 27 shown in FIG. 3B) that is configured to receive a corresponding standard format optical fiber connector or a dust plug 29 (when the optical fiber connector is not disposed in the connector port. FIG. 3A shows duct plug 29 disposed in the connector port in each of the first and second connector receiving portions to prevent dust from entering the alignment sleeve of the optical fiber connector adapter which might affect the intermating of optical fiber connectors joined by the optical fiber connector adapter. A metallic clip mechanism 22, shown in FIG. 3A, can be disposed around one of the first and the second connector receiving portions to secure optical fiber connector adapter at least partially within port adapter 200. In particular, the clip mechanism includes a pair of cantilevered spring arms 23 are angled away from the connector receiving portion to which the clip mechanism is attached and toward flange 25.

Port adapter 200 includes coupling catch protrusions 206 that extend partially into passageway 205. When the optical fiber connector adapter is pushed into the port adapter, the coupling catch protrusions become lodged between the free end of the cantilevered spring arms 23 of the clip mechanism 22 and the flange 25 of the optical fiber connector adapter 20 securing the optical fiber connector adapter at least partially within port adapter as shown in FIG. 3B.

The passageway 205 through port adapter 200 accepts at least a portion of an optical fiber connector adapter 20 to be inserted therein. In an exemplary aspect, the passageway through the port adapter is designed to be close fitting with connector adapter 205 to stabilize and orient the connector adapter when it is disposed in a port structure of a terminal or bulkhead.

Port adapter 200 can further include legs 232a, 232b extending from the second end 204 of the body 201 of port adapter 200. Each leg includes a raised bump 233 formed on its exterior surface to aid in securing sealing device 100 within the port structure of a fiber terminal, enclosure or bulkhead. The connection portion 140 of the sealing device 100 is compressed between the internal surface of the port structure and the bump on the legs of the port adapter. In one exemplary aspect, legs 232a, 232b can have different widths. In the exemplary aspect shown in FIG. 3A, leg 232b is wider than leg 232a. This difference in width in cooperation with the internal shape of the connection portion ensures that the sealing device is inserted into the port structure in a specific orientation.

Figure 4A:
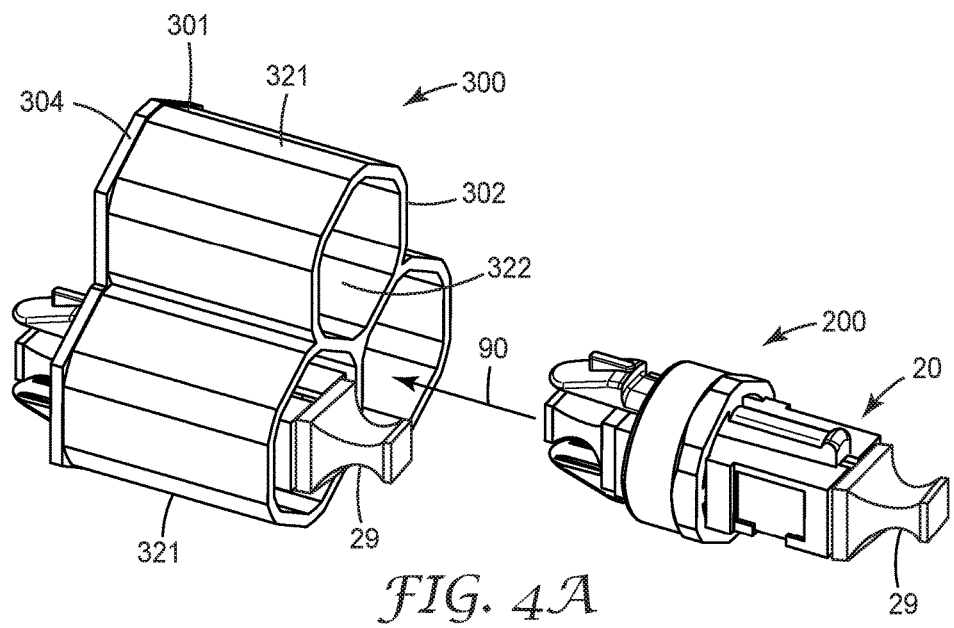
FIGS. 4A-4C are three views showing the installation of the port adapter of FIGS. 3A-3B into a port structure of an exemplary fiber optic terminal.
Figure 4B:
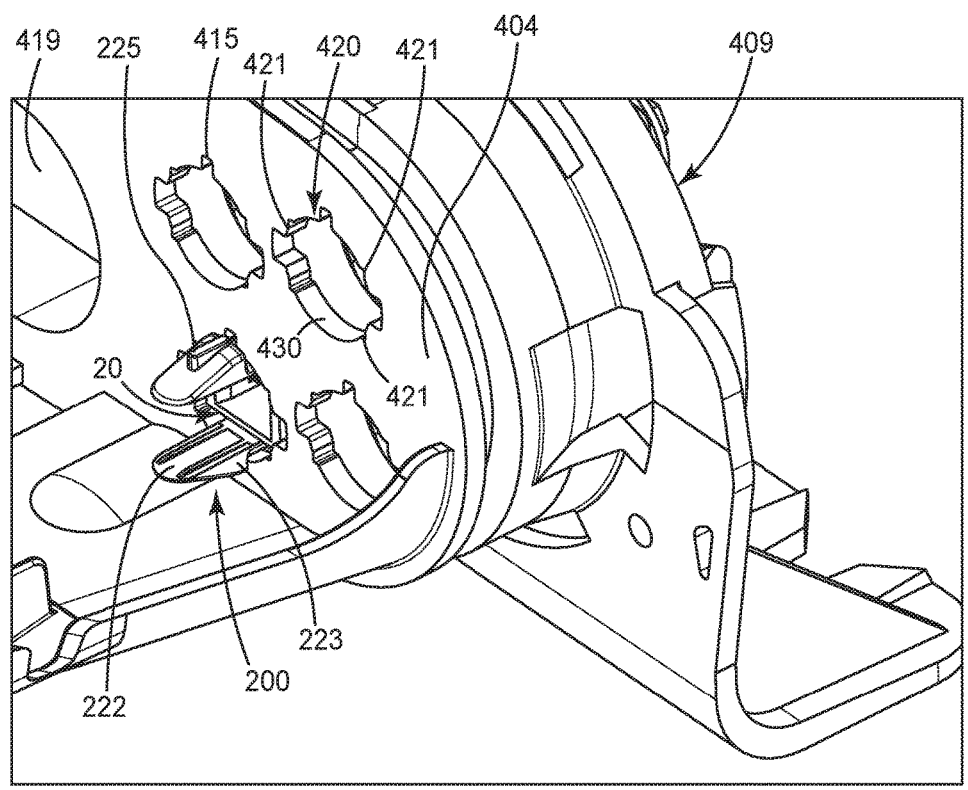

FIG. 4A shows the insertion of an exemplary port adapter into a schematic representation of port structure 300 as described previously. The port adapter is inserted into channel 322 from the second end 302 of the port structure from outside the terminal or enclosure in a direction indicated by arrow 90, until the port latches 222a, 222b engages with wall portion 304 around the port opening through which the hooked portions pass. FIG. 4B shows the base 409 of a fiber terminal having a plurality of port openings 430. A port adapter has been inserted in one of the posts showing the hooked portions 223 engaged with wall portion 404 which locks the port adapter 200 within the port structure of the enclosure in which it is installed.

Figure 4C:
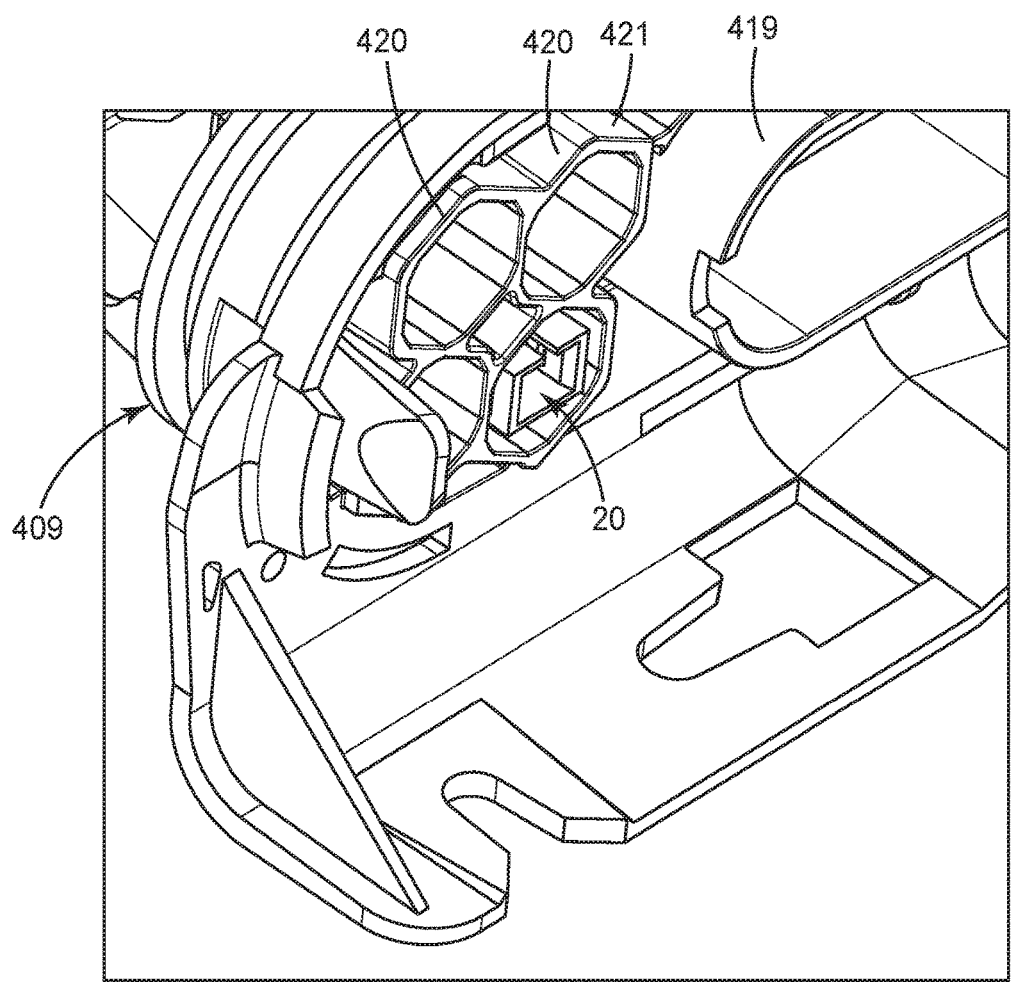
Figure 5A:
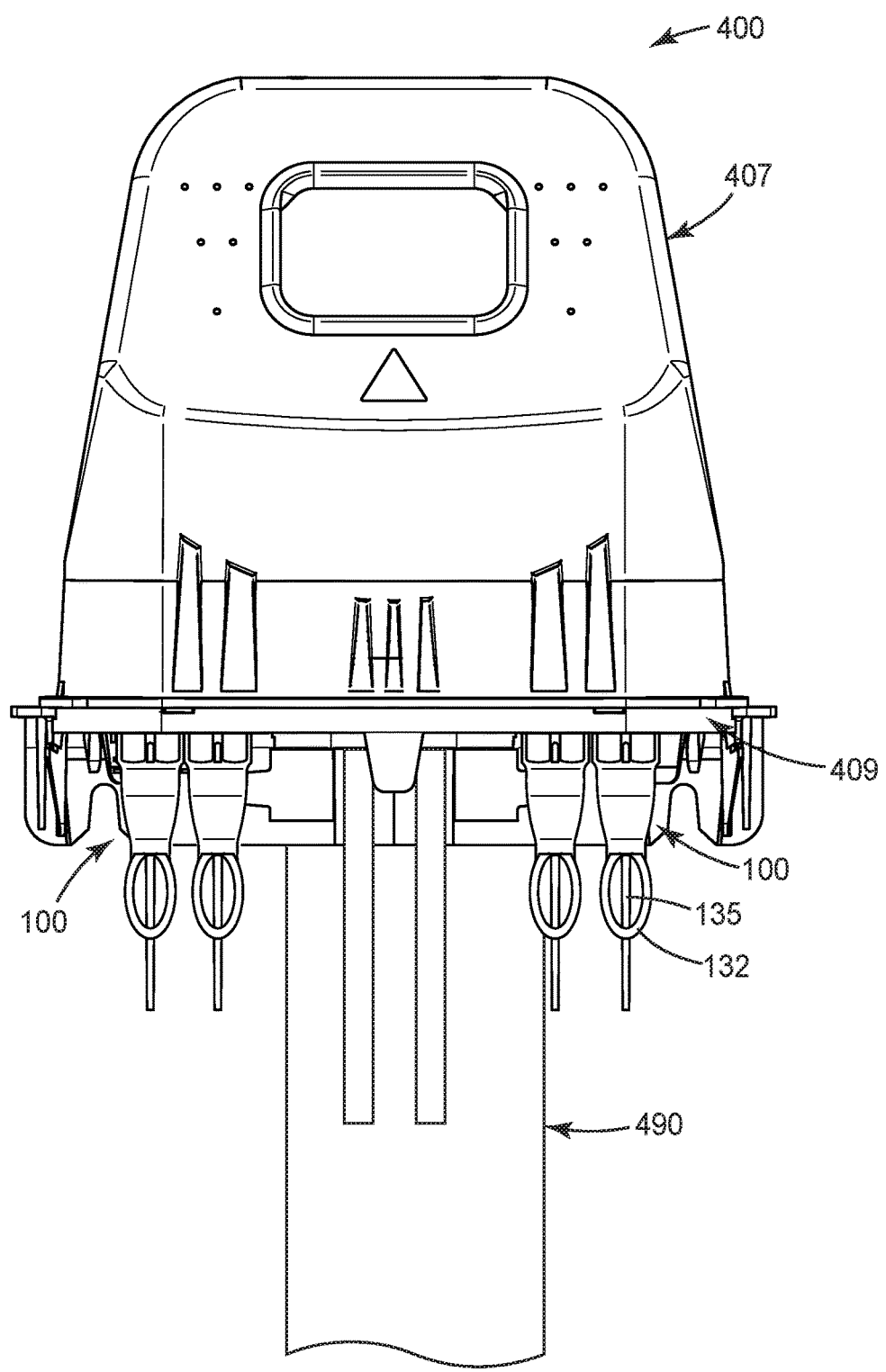
FIGS. 5A-5J illustrates the installation of a fiber optic drop cable with a standard format optical fiber connector in an exemplary fiber optic terminal according to an aspect of the invention.

Referring to FIGS. 4B, 4C and 5A, fiber terminal 400 includes a base 409 and a cover 407 (FIG. 5A) that is removably securable to the base. An exemplary fiber terminal is described in commonly owned US Pat. Publication No. 2015/0253528, incorporated herein by reference in its entirety. The base 409 includes at least one port or port structure 420 for receiving ruggedized optical fiber connector. The base may have one, two, or any other number port structures 420 as needed for a particular application. Base 409 of the fiber terminal includes two clusters of hexagonal close packed port structures 420 (one of which is shown in FIG. 4C) disposed on either side of an oval port structure 419 allowing for a higher density of ports in a smaller amount of space, thus increasing the capacity of enclosure 400. The cover may be secured to the base 409 by a bail, clamps or other mechanical fastening method. When engaged, the base and cover provide protected space within the enclosure for the internal components such as splice trays, splitters/splitter modules, fan-out devices, etc. from the weather, insects and other external hazards.

The portion of the telecommunication enclosure 400, shown in FIGS. 4B and 4C, includes a wall section 404 having a plurality of port structures 420 for receiving a fiber optic connector adapter therein. In a first aspect, the port structure has an integral sleeve section 421 disposed around the port opening 422 outside of the fiber terminal 400. The exemplary sleeve section of port structure can be generally hexagonal port structure extending from an end wall of the enclosure. Alternatively, the sleeve portion can have to form of a cylindrical tube, a rectangular tube or other polygonal tubular shape. In an alternative aspect, the sleeve portion can extend into the body of the enclosure, while in yet another aspect a portion of the sleeve portion around the port can extend from an exterior wall of the enclosure and a portion can extend from an interior wall of the enclosure into the body of the enclosure.

Referring to FIGS. 6A-6D, an alternative exemplary multi-use sealing device 500 has a body 501 having an open end 510 and a closed end 530 and a rigid connection portion 550 disposed within the open end of the body. In one aspect, the rigid connection portion can be press fit into the body, while in an alternative aspect, the rigid connection portion can be permanently attached to the rigid portion. In an exemplary embodiment, sealing device 500 can be formed by via an insert molding process.

Sealing device 500 provides suitable softness on the "cable side" to ensure that a non-ruggedized fiber connector can be passed through the insertion opening after the removable portion is excised from the body as well as having suitable elasticity to ensure environmental sealing around the fiber drop cable once the non-ruggedized connector has passed through the insertion opening. The rigid connection portion can provide enhanced retention of the sealing device in the port structure of a fiber terminal or telecommunication enclosure, even when the fiber cable is subjected to torsional and/or flexing forces.

Figure 6A:
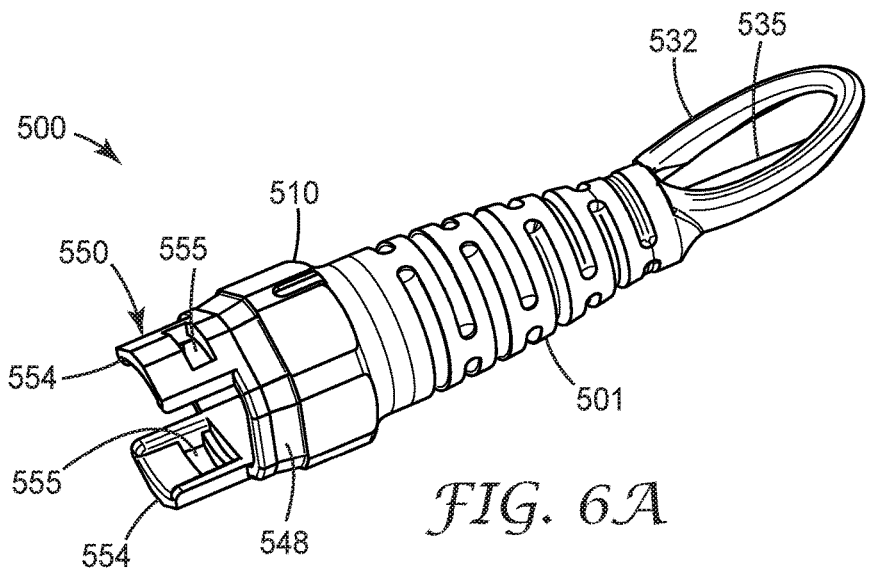
FIGS. 6A-6E show five views of a second embodiment of an exemplary multi-use sealing device according to an aspect of the present invention.
Figure 6B:
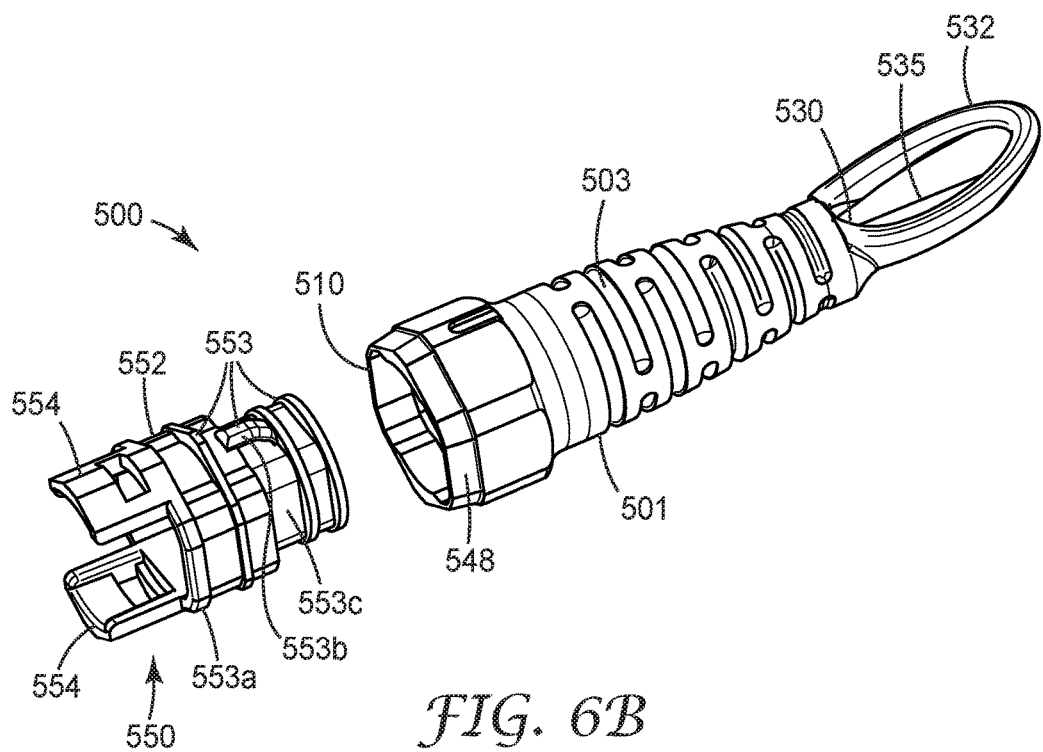
Figure 6C:
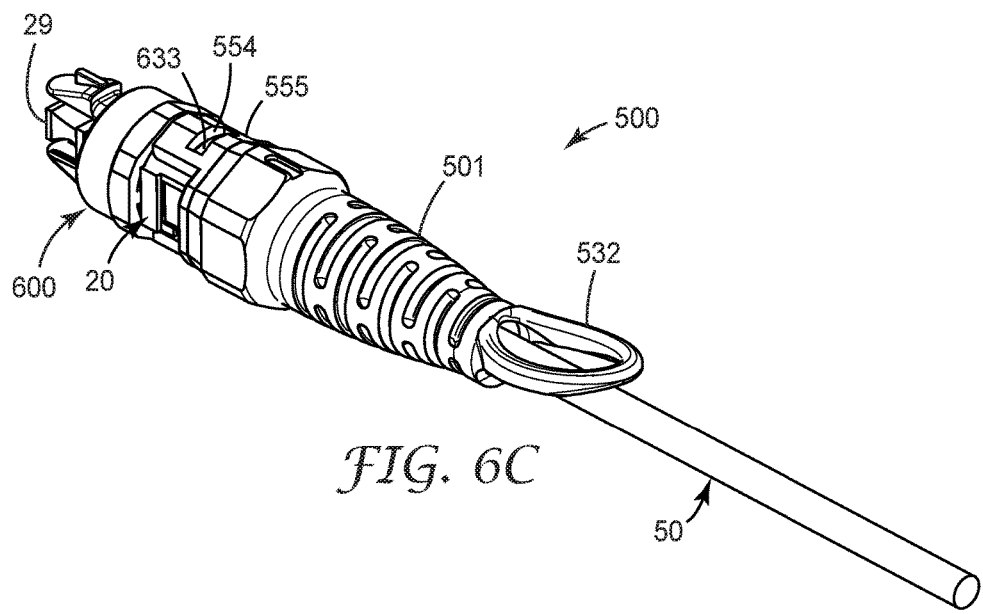
Figure 6D:
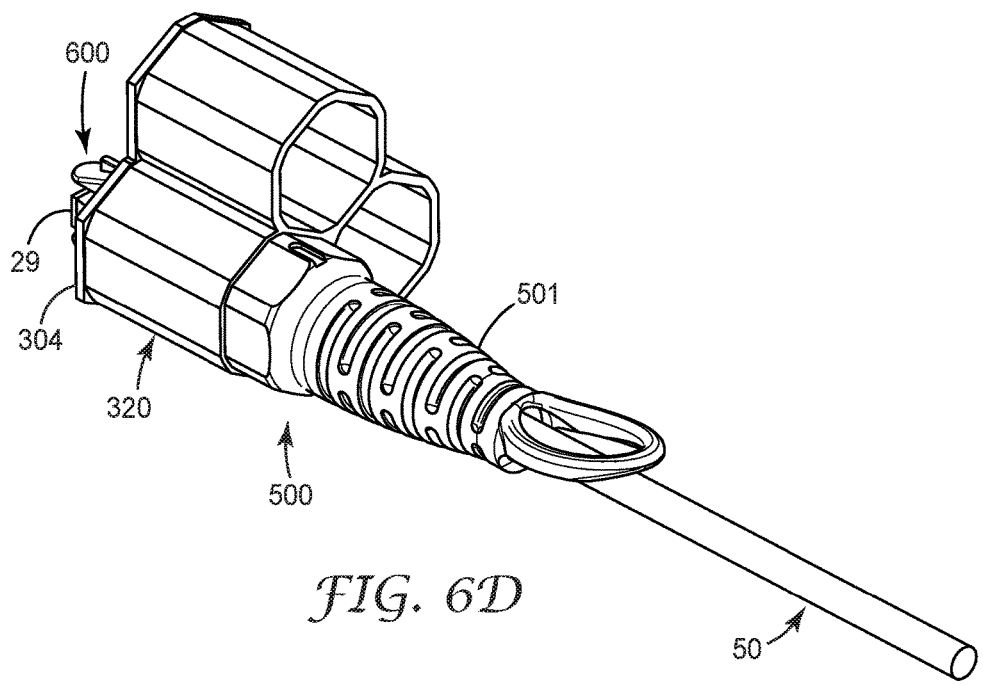
Figure 6E:
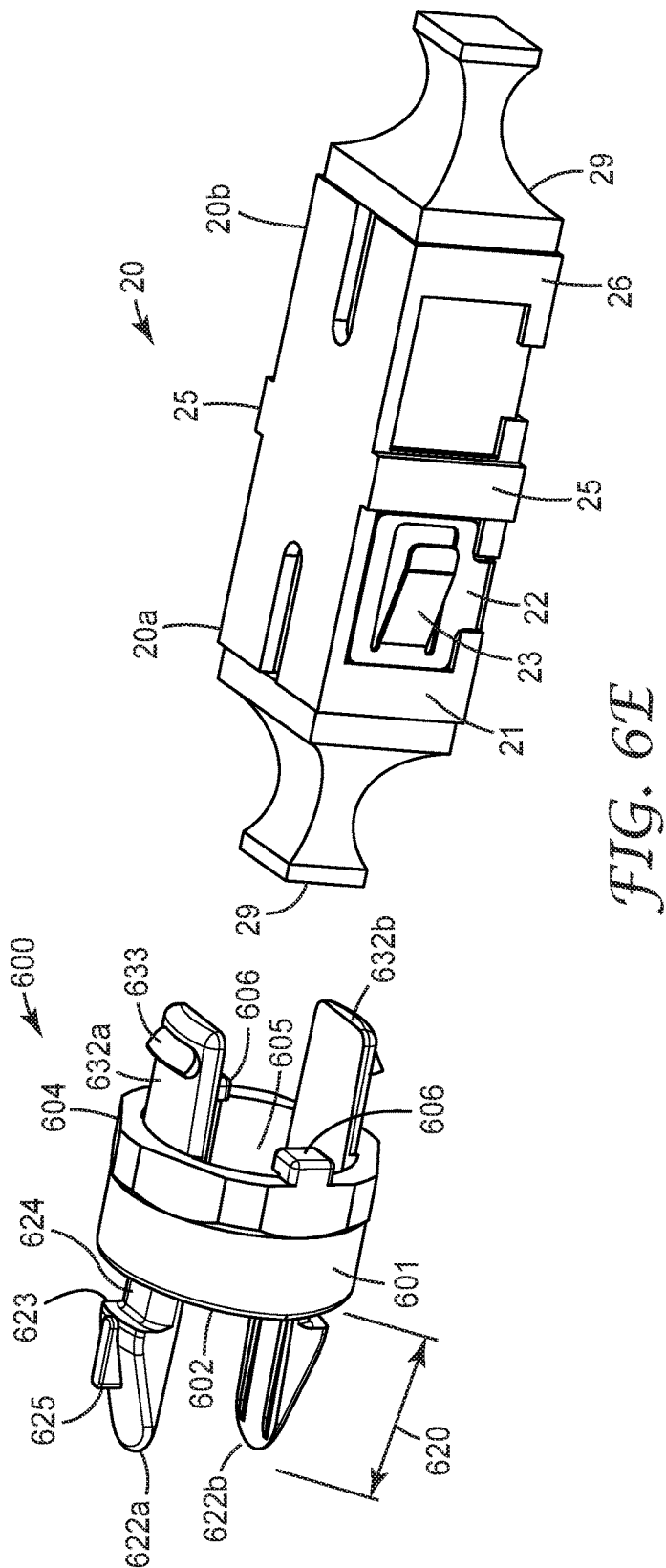

Sealing device 500 is configured to mate with port adapter 600 shown in FIGS. 6C and 6E. Port adapter 600 is substantially the same as port adapter 200 described previously. Port adapter 600 has an adapter body 601 having a first end 602 and a second end 604 and a passageway 605 extending through the adapter body from the first end to the second end. Adapter body 601 includes a securing portion 620 extending from the first end of the adapter body configured to secure the port adapter into the port structure of a protective enclosure or terminal via port latches 622a, 622b. The port latches can be in the form of spring arms that have a notch 624 between the adapter body 601 of port adapter 600 and a hook portion 623 that engages with a wall 304 of the port structure 320 (FIG. 6D). The port latches can be flexed in toward the centerline of the port adapter when the port adapter is inserted into the port structure. Once the first end of the port adapter has passed a sufficient distance through the port structure, the port latches spring out so that hooked portions on an outer surface of the latch arms engage with the port structure to secure the port adapter therein. In an exemplary aspect, the port adapter can have a keying protrusion 625 formed on at least one of the exterior port latches to serve as a key when the port adapter is inserted into the port structure in a known orientation.

The port adapter further includes legs 632a, 632b extending from the second side of the body as shown in FIG. 6E. Each leg comprising a protrusion or catch 633 disposed on an external surface of the leg, wherein the catches are configured to engage with an opening formed in the connection portion of sealing device 500. Specifically, the rigid connection portion 550 has a collar 552 and a pair of latch arms 554 extending from the collar opposite the body of the sealing device. Each of the latch arms can include an opening 555 or recess that is configured to engage with protrusions or catches 633 on the port adapter. FIG. 6C shows the engagement of the catches 633 of the port adapter with the openings on the latch arms of sealing device 500.

Collar 552 of rigid connection portion 550 includes an internal passageway that is sized to allow passage of a variety of standard format non-ruggedized connectors such as those described previously. The exterior surface of the collar can include one or more interlocking structures 553 to permanently attach the body 501 of sealing member 500 to the rigid connection portion. In the exemplary aspect shown in FIG. 6B, the interlocking structures include vertical circumferential walls 553a, a stepped exterior surface 553c, and reverse hook structures 553b. Other interlocking structures can include inclined walls, barbs, teeth etc. as would be known in the art.

The external dimensions of the open end 510 of the body portion 501 disposed over the collar 552 of the rigid connection portion 550 is formed so that it is slightly larger than the internal dimensions of the port structure into which it is inserted so that it with engage with the port structure to prevent ingress of dust and moisture into the optical fiber terminal prior to providing the final service connection to the customer and provide environmental protection to the interior of the fiber terminal, telecommunication enclosure or space behind a bulkhead. The closed end 530 includes a removable portion 535 and a pulling loop 532 to facilitate removal of the exemplary sealing device from the exemplary sealing device from a port structure. When the removable portion is in place, sealing device 500 can be used as a dust cap and sealing member for a port structure of an optical fiber terminal as shown in FIG. 5A. When a customer requests service, the installer can grasp the pulling loop 532 of the exemplary sealing to extract the pulling device from the port structure to allow connection of a preterminated optical fiber drop cable, which is described in detail below.

In an exemplary embodiment, the body 501 of sealing device 500 is formed of an injection molded resilient material. The resilient material is selected such that the sealing face 548 of the sealing device 500 can be compressed when introduced into the port structure to provide an environmental seal with the port structure. The selection of the correct resilient material allows closed or second end to manage the bend radius of the fiber drop cable after connection to the fiber terminal. In an exemplary aspect, the body 101 of the sealing device 100 can have a smooth external surface as shown in FIGS. 1A-1D, while in an alternative aspect, the external surface of the body 501 of sealing device 500 can include bend control features 503. The bend control features can be a network of ridges and channels that can facilitate and control the way body 501 bends when external forces are applied to the fiber drop cable passing therethrough. The pattern, density and shape of the bend features can be modified to change the bend characteristics of body 501. The exemplary resilient material can be similar to the materials describe above with respect to body 101.

The rigid connection portion can be an injection molded part from a resin material. In an exemplary aspect the resin material van be selected from glass filled polypropylene, a glass filled polyaramide or an engineering resin. The resilient body material (as described previously) is overmolded around the rigid connection portion by a compression molding process.

An advantage of the exemplary sealing devices 100, 500 of the present disclosure can environmentally seal a port of a fiber terminal, enclosure or bulkhead before and after a service connection (i.e. an empty port as well as a port containing an externally inserted connector on the end of an optical fiber drop cable) with a simple modification. The exemplary sealing devices allow the use of standard format fiber connectivity providing a plug and play solution in fiber to the home installations without the expense of specialized hardened connectivity solutions (i.e. optical fiber drop cables that have been either factory or field terminated with a non-ruggedized standard format optical connector, standard optical fiber connector adapters, etc.). In addition, the exemplary sealing devices allow the service provider to extend their fiber networks closer to the end user with less upfront costs.

For example, the service provider can install an aerial terminal 400 on a telephone pole 490 as shown in FIG. 5A. The aerial fiber terminal has a plurality of ports disposed within a port structure, an optical fiber connector adapter 20 (FIGS. 5H and 5I) disposed in each of the plurality of ports and the exemplary multi-purpose sealing device 100 removably disposed in each of the plurality of ports when the terminal is added to the network. The exemplary sealing device has a body having an open end and a closed end, wherein the closed end includes a removable portion 135 and a pulling loop 132 defining a first state. In this configuration the exemplary sealing device 100 provides an environmental barrier or seal to the port in which it is installed. Thus, in the first state, the exemplary sealing device can be thought of as a dust cap or dust plug for the port.

Figure 5B:
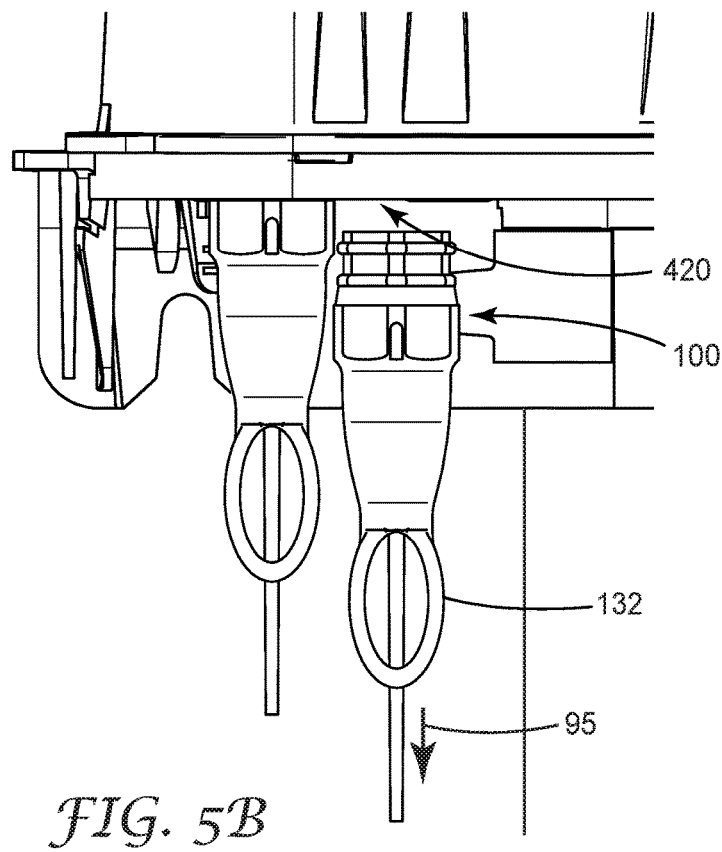

When a customer requests service, a craftsman extracts sealing device 100 from the port by gripping the pulling loop and exerting an extraction force away from the fiber terminal as illustrated by directional arrow 95 as shown in FIG. 5B.

Figure 5C:
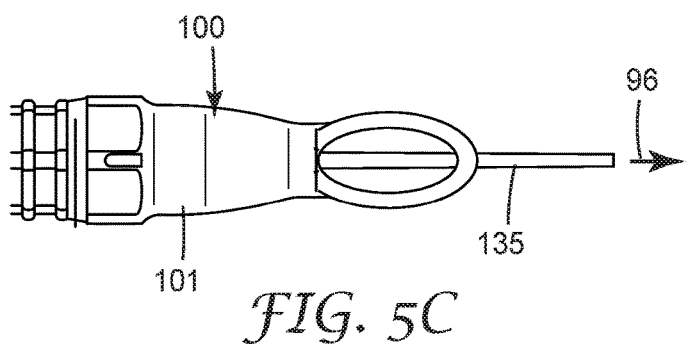
Figure 5D:
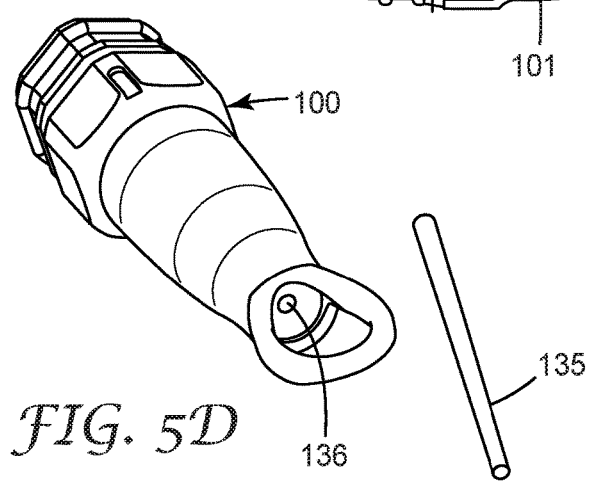

To make the service connection, the craftsman can grip the body 101 of the exemplary sealing device 100 in one hand and the removable portion 135 of the sealing device in the other hand or with a tool such as a pair of pliers. Pulling the removable portion away from the sealing device body as shown in FIG. 5C by directional arrow 96 separates the removable portion from the body of the sealing device leaving an insertion opening 136 as shown in FIG. 5D.

Figure 5E:
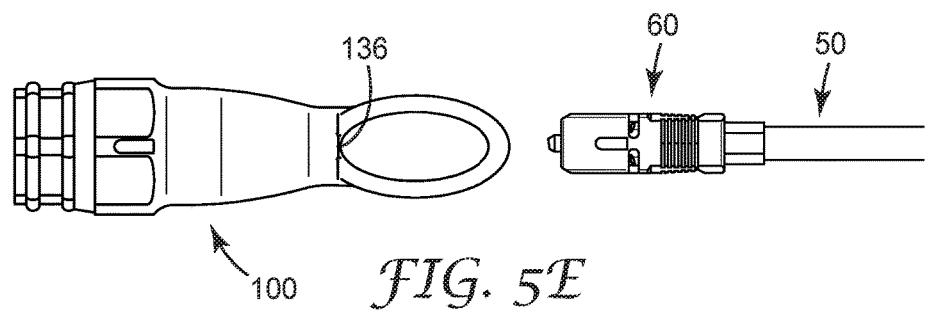
Figure 5F:
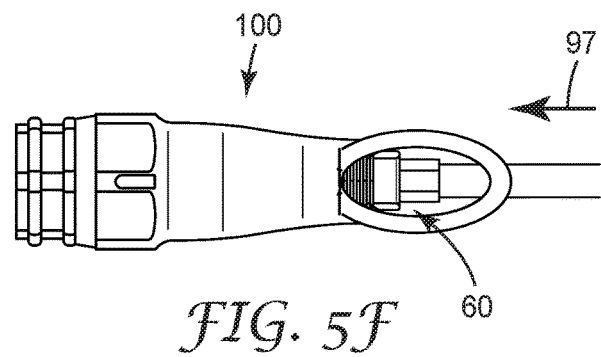
Figure 5G:
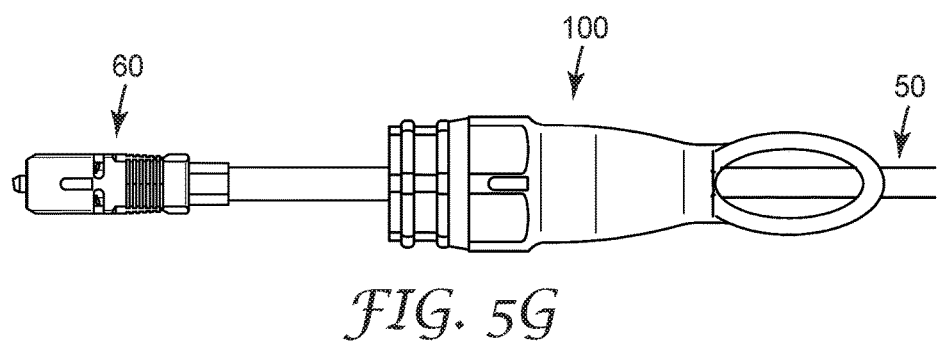
Figure 5H:
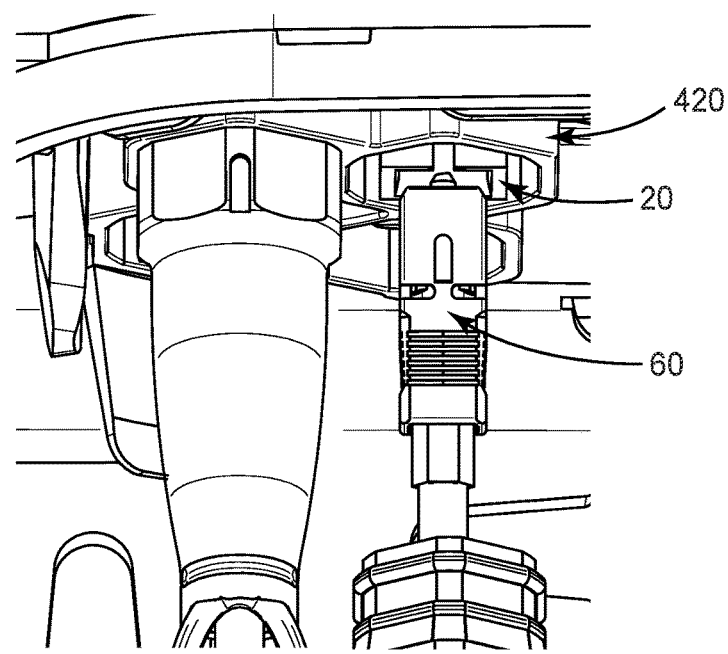
Figure 5I:
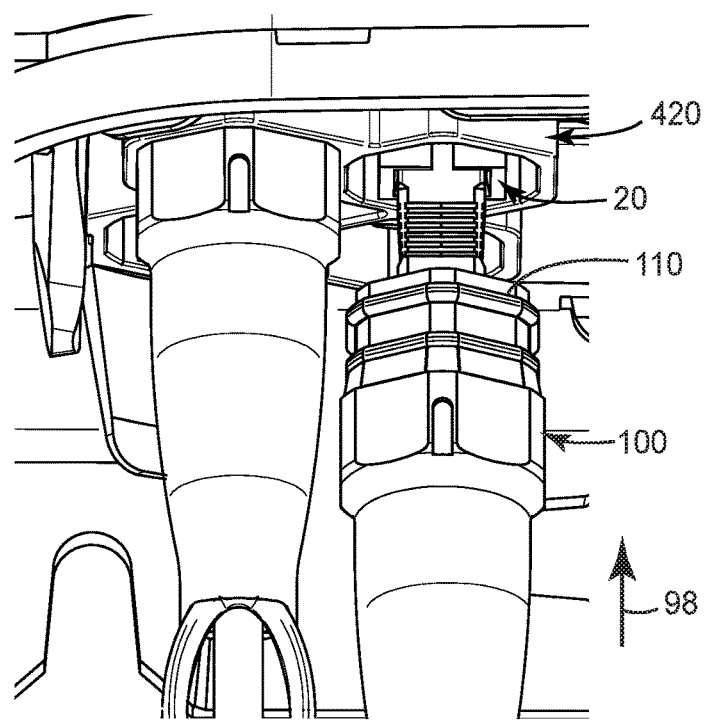
Figure 5J:
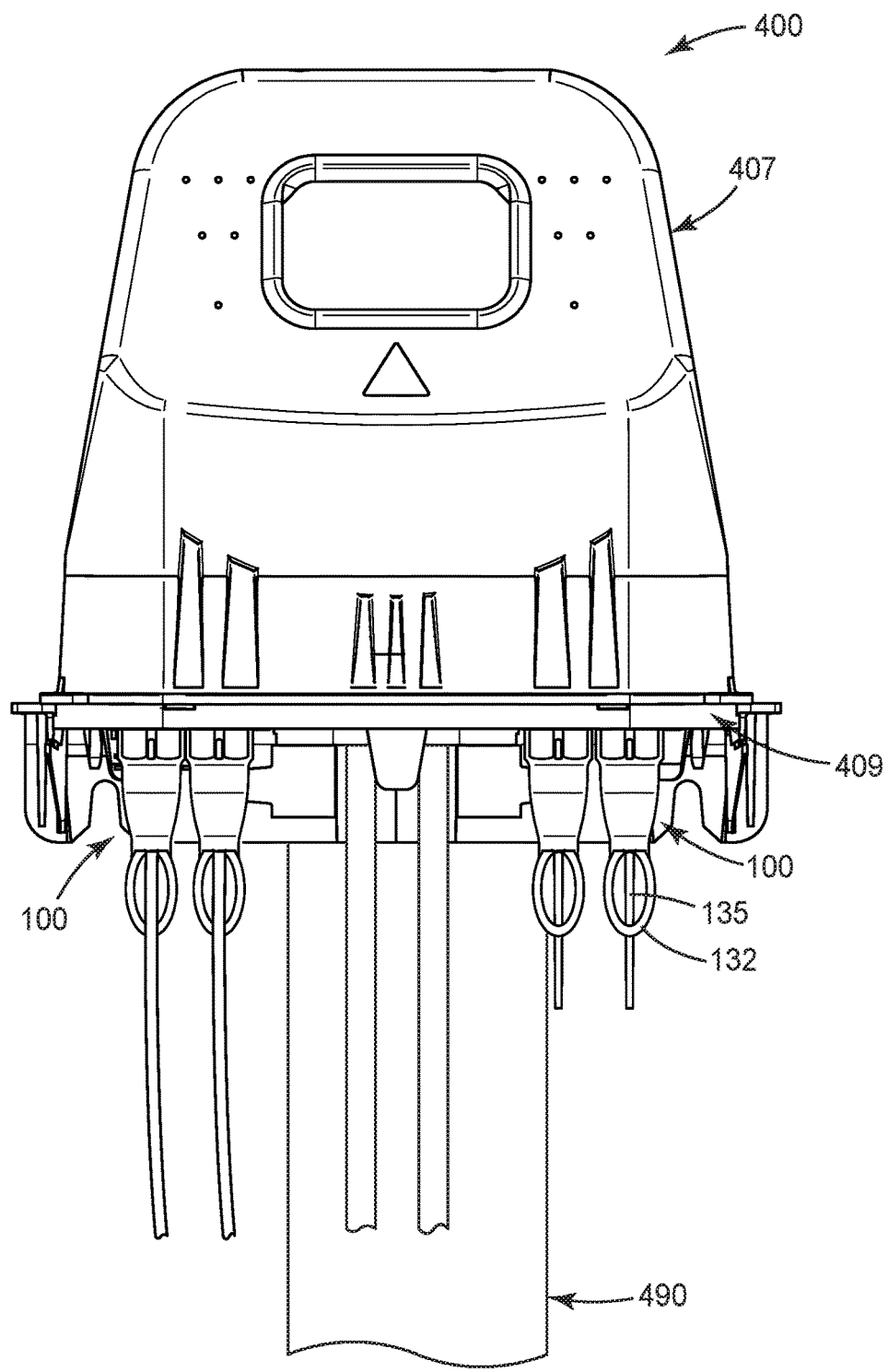

Next, the craftsman takes the non-ruggedized optical fiber connector 60 disposed on the terminal end of a fiber drop cable 50 and inserts the non-ruggedized optical fiber connector through the insertion opening 136 of the sealing device 100 (see directional arrow 97 in FIGS. 5E and 5F. The resilient material of the exemplary sealing device can be stretched as the optical connector is inserted and then contract around the jacked of the optical fiber drop cable once the optical fiber connector has passed completely through the insertion opening. FIG. 5F shows the exemplary sealing device 100 disposed on the end of a preterminated fiber drop cable 50. The craftsman then plugs the non-ruggedized optical fiber connector 60 into the optical fiber connector adapter 20 disposed within one of the plurality of ports in the port structure 420 of the fiber terminal 400 as shown in FIG. 5H.

Finally, the open end 110 of the sealing device 100 is pushed (see directional arrow 98 in FIG. 5I) into the port around the optical fiber connector 60 yielding the second state of the exemplary sealing device. In the second state, the exemplary sealing device creates an environmental seal between the device and the port of the terminal and the optical fiber drop cable and the device. In some aspects, the exemplary sealing device can also help in maintaining the minimum bend radius of the fiber drop cable as it exits the terminal port structure. In still other embodiments, the exemplary sealing device can also be used to strain relieve the optical fiber drop cable.

While the present description has focused on the use of the exemplary sealing device in fiber optic based systems, one of ordinary skill would recognize that the teachings of the present sealing device could be readily extended to copper based systems where small electrical signal connectors such as an RJ-11 plug, RJ-45 plug, etc., need to be environmentally protected when entering the port structure of a telecommunication terminal, enclosure or passing through a bulkhead and should be considered within the scope of the present invention.

The exemplary port adapter enables a standard format optical fiber connector adapter to be held within a port structure of a fiber terminal in a known orientation allowing the installer to plug a fiber drop cable with a standard format connector into the port of the fiber terminal to make an optical connection without having to open the fiber terminal. The exemplary multi-purposed device of the present invention can be inserted partially into the open end of the port structure before and after a service connection is made to prevent migration of dust and moisture into the interior of the fiber terminal.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein.

What is claimed is:

1. A multi-purpose sealing device for a port structure in a fiber terminal, enclosure or bulkhead, the sealing device comprising:
   a body having an open end and a closed end, wherein the closed end includes a removable portion and a pulling device to facilitate removal of the exemplary sealing device from the exemplary sealing device from a port structure, and
   a connection portion configured to secure the sealing device in the port structure.

2. The device of claim 1, wherein the pulling device is a pulling loop.

3. The device of claim 1, wherein the body and the connection portion is a single part made of a resilient material.

4. The device of claim 1, wherein the connection portion is a rigid plastic part fitted into the open end of the body.

5. The device of claim 4, wherein the body is overmolded onto at least a portion of the connection portion.

6. The device of claim 4, wherein the body is formed of a resilient material.

7. The device of claim 6, wherein the resilient material is one of acrylonitrile butadiene rubber, a silicone rubber and an ethylene propylene diene monomer rubber.

8. The device of claim 6, wherein the resilient material has a Shore A hardness from about 30 to about 50.

9. The device of claim 1, further comprising an inclined sealing face disposed between the body and the connection portion that is configured to seal against the port structure to provide an environmental seal.

10. A multi-purpose sealing system for a port structure in a fiber terminal, enclosure or bulkhead, the sealing device to enable plug and play service for fiber optic drop cable connections; the system comprising:
    an optical fiber connector adapter;
    a port adapter to secure the optical fiber connector adapter at least partially within the port structure and
    a multi-purpose sealing device configured to environmentally seal the port structure before and after a service connection is made, wherein the multi-purpose sealing device comprises a body having an open end and a closed end, wherein the closed end includes a removable portion and a pulling device to facilitate removal of the sealing device from the port structure, and a connection portion configured to secure the sealing device in the port structure.

11. The system of claim 10, wherein the body and the connection portion is a single part made of a resilient material.

12. The system of claim 11, wherein the sealing device is secured in the port structure between an inside wall of the port structure and at least a portion of the port adapter.

13. The device of claim 10, wherein the connection portion is a rigid plastic part fitted into the open end of the body.

14. The device of claim 13, wherein the rigid connection portion has a collar and a pair of latch arms extending from the collar opposite the body of the sealing device, wherein each of the latch arms has an opening that engages with catches on the port adapter to secure the sealing device to the port adapter.

15. The device of claim 13, wherein the body is a resilient material that is overmolded onto at least a portion of the connection portion.

16. The device of claim 11, wherein the resilient material is one of acrylonitrile butadiene rubber, a silicone rubber and an ethylene propylene diene monomer rubber having a Shore A hardness from about 30 to about 50.

17. The device of claim 10, further comprising an inclined sealing face disposed between the body and the connection portion that is configured to seal against the port structure to provide an environmental seal.

18. The device of claim 10, wherein the optical fiber connector adapter is one of an LC-format optical fiber connector adapter, an SC-format optical fiber connector adapter and a MPO-format optical fiber connector adapter.

19. A method of making a service connection, comprising:
    providing a fiber terminal having a plurality of ports, an optical fiber connector adapter disposed in at least one of the plurality of ports and a multi-purpose sealing device removably disposed in the at least one of the plurality of ports, wherein the sealing device has a body having an open end and a closed end, wherein the closed end includes a removable portion and a pulling loop;
    extracting the sealing device by grabbing onto the pulling device and exerting an extraction force away from the fiber terminal;
    tearing the removable portion away from the closed end of the sealing device to create an insertion opening;
    inserting a non-ruggedized optical fiber connector through the insertion opening of the sealing device;
    plugging the non-ruggedized optical fiber connector into the optical fiber connector adapter disposed within the at least one of the plurality of ports; and installing the sealing plug into one of the plurality of ports over the non-ruggedized optical fiber connector by inserting the open end of the sealing device into said port.

* * * * *